United States Patent [19]

Kameyama et al.

[11] 4,420,029
[45] Dec. 13, 1983

[54] APPARATUS FOR BLOCKING ESCAPE OF HEAT IN HOT SLABS MANUFACTURED ON CONTINUOUS CASTING MACHINES

[75] Inventors: Kazuhide Kameyama, Kawachi-Nagano; Takahiro Kiyofuji, Sakai, both of Japan

[73] Assignee: Nippon Steel Corporation, Tokyo, Japan

[21] Appl. No.: 406,727

[22] Filed: Aug. 9, 1982

Related U.S. Application Data

[63] Continuation of Ser. No. 143,924, Apr. 23, 1980, abandoned.

[30] Foreign Application Priority Data

Apr. 27, 1979 [JP] Japan ................................. 54-55902
Jul. 10, 1979 [JP] Japan ................................. 54-94112
Feb. 25, 1980 [JP] Japan ................................. 55-21542

[51] Int. Cl.³ ........................................... B22D 11/128
[52] U.S. Cl. ................................... 164/448; 164/154; 164/417; 164/452
[58] Field of Search .............. 164/448, 442, 417, 76.1, 164/154, 452; 72/200, 202

[56] References Cited

U.S. PATENT DOCUMENTS

| 3,447,591 | 6/1969 | Foldessy | 164/442 |
| 3,538,980 | 11/1970 | Gallucci | 164/442 X |
| 3,837,390 | 9/1974 | Bode, Jr. | 164/442 X |
| 4,261,552 | 4/1981 | Kameyama et al. | 164/263 X |

FOREIGN PATENT DOCUMENTS

45-415 1/1970 Japan ................................. 72/202

Primary Examiner—Gus T. Hampilos
Assistant Examiner—J. Reed Batten, Jr.
Attorney, Agent, or Firm—Wenderoth, Lind & Ponack

[57] ABSTRACT

An apparatus for blocking escaped heat in hot slabs manufactured on a continuous-casting machine. The apparatus has a heat containing cover extending in the longitudinal direction of the slab on both sides of the withdrawal guide rolls. The upper and lower portions of the heat containing cover each have a semi-circular cut to receive the lower part of a top guide roll and the upper part of a bottom guide roll. The heat containing cover can be reciprocated in the direction of the axis of the guide rolls so that a desired clearance is left between the cover and the edges of the slab.

3 Claims, 17 Drawing Figures

APPARATUS FOR BLOCKING ESCAPE OF HEAT IN HOT SLABS MANUFACTURED ON CONTINUOUS CASTING MACHINES

This is a continuation application of application Ser. No. 143,924, filed Apr. 23, 1980 and now abandoned.

This invention relates to an apparatus for blocking escape of the heat in hot slabs, and more particularly to an apparatus for effectively blocking the escape of the heat in hot slabs being carried through a continuous casting machine.

BACKGROUND OF THE INVENTION AND PRIOR ART

Figure 1:
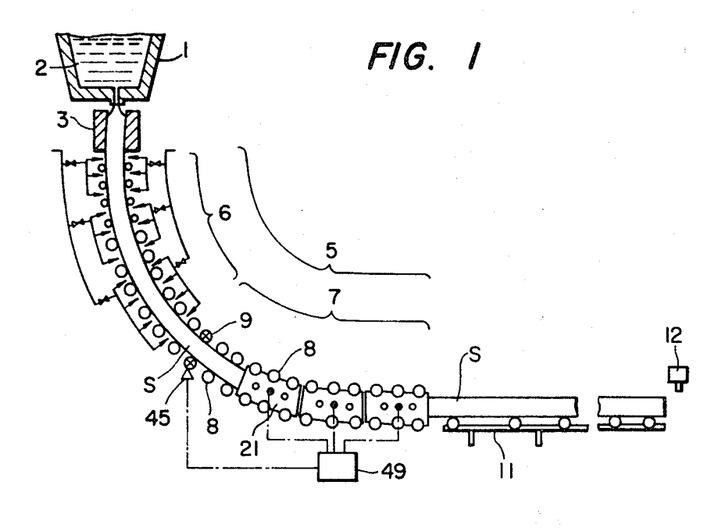
FIG. 1 is a cross-sectional view showing the structure of a common continuous casting machine, equipped with a heat escape blocking apparatus according to this invention.
Figure 2:
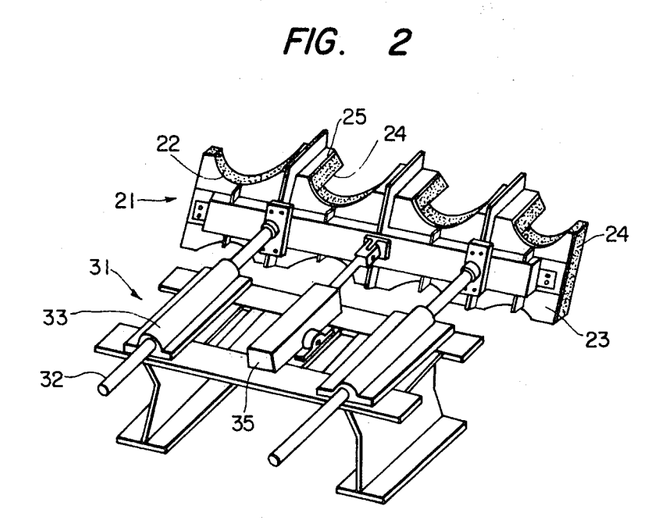
FIGS. 2 and 3 are a perspective view and a transverse cross section, respectively, showing a first embodiment of the heat escape blocking apparatus according to this invention.

In a continuous casting machine, as shown in FIG. 1, molten steel 2 held in a tundish 1 is poured into a mold 3 by which the steel is cast into a slab S. The slab S is continuously withdrawn from the mold by a group of withdrawal guide rolls 5 (hereinafter called the guide rolls) onto a slab runout table 11 (hereinafter called the runout table). On the runout table 11, the continuously cast slab S is cut into desired lengths by a cutting device 12, and then forwarded to a subsequent process. This completes continuous casting operation. The length of the guide roll group 5 and that of a water-cooled zone 6 therein are appropriately chosen so that the central part of the cast slab S has solidified by the time it clears the delivery end of the guide roll group 5 or when it passes from the guide roll group 5 onto the runout table 11.

Conventionally, the cast slab S, after being cut by the cutting device 12, is cooled to room temperature for cold scarfing or temporary storage. Then it is reheated in a heating furnace and supplied to a subsequent rolling line. But cooling the cast slab S, which has a temperature as high as 1000° C. or more at the time of completion of solidification, entails a great energy loss. In addition, the provision and maintenance of the cooling equipment, the heating furnace, etc. costs a considerable amount.

Recently, therefore, many attempts have been made to carry out so-called continuous rolling in a manner so as to supply continuous cast hot slabs directly to the rolling process, i.e. without carrying out the conventional cooling and reheating to the temperature required for the rolling operation for hot charging for supplying the cast slabs to the rolling process.

To permit such continuous casting and direct charging, it is essential to keep the slab temperature as high as possible by preventing the temperature from dropping during the travel of the slab through the continuous-casting machine. For this purpose, various heat escape blocking devices have been proposed.

However, a continuous casting machine comprises many pieces of equipment, instruments, etc. arranged in a small space. Moreover, a single machine can be changed over for casting slabs of different widths. Because of these limitations, the heat escape blocking devices thus far proposed have been nothing more than a casing substantially completely enclosing the guide rolls. Therefore, many problems arise, such as their practicality, the low heat blocking effect and various maintenance difficulties.

SUMMARY OF THE INVENTION

This invention is intended to solve the aforementioned problems arising in the conventional heat escape blocking apparatus for continuous casting machines.

An object of this invention is to provide a heat escape blocking apparatus that is capable of keeping the cast slab withdrawn from the guide roll group at as high a temperature as possible.

Another object of this invention is to provide a heat escape blocking apparatus that permits, with its high heat conserving ability, efficient continuous rolling and/or hot charging of the cast slab.

Still another object of this invention is to provide a heat escape blocking apparatus that prevents collision of the cast slab with the apparatus, thereby preventing the breakage of the apparatus, and has a high maintainability.

In order to achieve the above objects, there is provided, according to the invention, an apparatus for blocking the escape of the heat in hot slabs on a continuous casting machine which comprises a heat containing cover extending in the longitudinal direction of the slab along both edges of the slab. The upper and lower portions of the heat containing cover each has a semi-circular cut to receive the lower part of a top guide roll and the upper part of a bottom guide roll. The heat containing cover can be reciprocated in the direction of the axis of the guide rolls so that a desired clearance is left between the cover and the edges of the slab.

This structure permits bringing the internal surface of the heat containing cover close to the edges of the slab, thereby reducing the clearance therebetween and increasing the efficiency of heat conservation. It can also prevent the slab from colliding with the heat containing cover, moving the cover back and forth when the head and the tail end of the slab respectively enter and leave the heat escape blocking apparatus.

That portion of the heat containing cover which lies between adjacent semi-circular cuts extends along the axis of the guide rolls and provides a visor between adjacent guide rolls. This visor permits the heat containing cover to cover the side portions of the upper and lower surfaces of the slab, thus adding to the efficiency of the apparatus in blocking escape of heat.

The heat containing cover has a projection or a roller adapted to contact each edge of the slab. The heat containing cover is constantly or intermittently pushed so that the projection or roller is kept in contact with the edge of the slab. This permits maintaining an appropriate clearance between the internal surface of the heat containing cover and the edges of the cast slab.

The provision of a heat containing cover over the runout table, in addition to the one over the guide roll group, makes it possible to keep the cast slab at still higher temperatures.

The invention will now be described in greater detail in connection with the accompanying drawings, in which:

DETAILED DESCRIPTION OF THE PREFERRED EMBODIMENTS

During an investigation of how the temperature of a cast slab S drops during its travel through a group of withdrawal guide rolls 5 (hereinafter called the guide roll group) and over a runout table 11 of a continuous casting machine as shown in FIG. 1, the inventors have found that the temperature drop is not uniform throughout the entire slab, but rather the temperature drop is much sharper in the two side portions than in the central part. It follows, therefore, that the temperature drop of the two side portions of the slab has an important effect on the continuous rolling and/or hot charging.

As a result of research and various experiments based on the above findings, the inventors have created a new heat escape blocking apparatus that is capable of efficiently blocking escape of the heat in both side portions of the cast slab. Referring now to the accompanying drawings, preferred embodiments of this invention will be described at length.

Embodiment I

Referring first to FIGS. 2-6, the heat escape blocking apparatus according to this embodiment comprises a plate 21 for reducing the amount of heat which escapes from the slab edge, i.e. for containing the heat within the slab (hereinafter called the heat containing plate) and a slidable support member 31 supporting the heat containing plate 21 for reciprocating movement toward and away from the edge of a slab. The slidable support member 31 comprises a rod-shaped slidable member 32 fastened to the heat containing plate 21 and a support member 33 slidably supporting the slidable member 32. The heat containing plate 21 is provided with a plurality of cut-out recesses 22 each shaped to correspond to a portion of the periphery of a guide roll 8, the recesses 22 being along the top and bottom edge of the plate 21. The heat containing plate 21 has a composite structure comprising an external holding plate 23 and a heat-insulating layer 24 mounted on the side thereof facing the slab. Further, the heat containing plate 21 of this embodiment has a plurality of visor-like strip members 25 fastened to the top and bottom edges thereof at positions between the recesses 22 and projecting toward the slab for filling the clearance between adjacent guide rolls 8. The length of the strip members 25 is sufficient for covering the side portion of the upper and lower surfaces of the cast slab S to a desired width. The heat containing plate 21 has an appropriate length so that the reciprocation thereof, described later, is accomplished smoothly and the effectiveness in blocking escape of heat, i.e. containing the heat within the slab, is increased. Heat containing plates 21 are provided on both sides of the path of the slab S in a desired part of an air-cooling zone 7 on the delivery end of the guide roll group 5 (see FIG. 1) so as to extend in the direction of travel of the cast slab S. Because it is kept close to the hot cast slab S for a long time, the heat-insulating layer 24 should preferably have high heat resistance and heat insulating property, and have a low specific gravity to reduce the weight of the heat escape blocking plate 21. According to the experience of the inventors, ceramic fiber type heat insulators have proved to satisfy the above requirements well.

Figure 3:
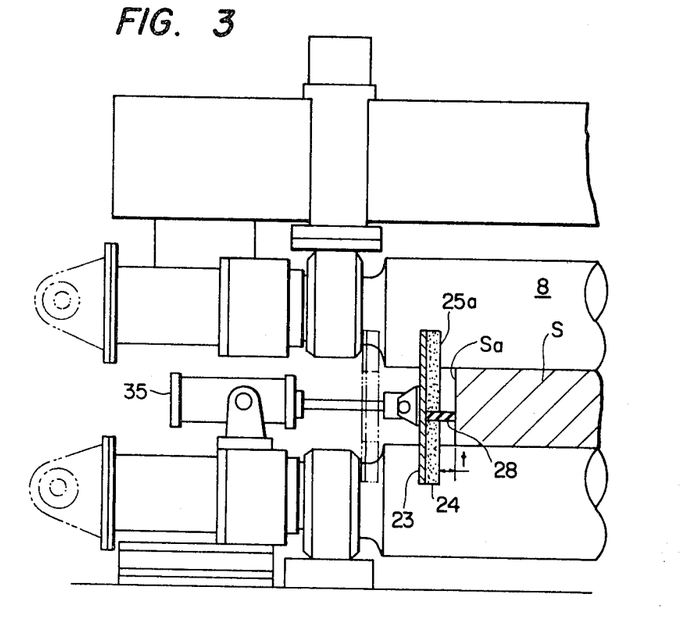

To enhance the effect of the heat escape blocking apparatus of this invention, it is essential to establish a minimum clearance t (hereinafter called the heat containing clearance t) between the edge of the slab Sa and the internal surface 25 of the heat-insulating layer 24, as shown in FIG. 3, and maintain such minimum clearance at all times while the slab is being carried through the apparatus. This invention makes it possible to keep the heat containing clearance t to a minimum substantially within the desired constant range by providing the recesses 22, corresponding in shape to the periphery of the guide roll, in the heat containing plate 21 and inserting the reciprocable heat containing plate 21 as desired between the top and bottom guide rolls.

FIG. 3 shows one means for maintaining the heat containing clearance t in the heat escape blocking apparatus of this invention. This means comprises a projection 28 for contacting the slab edge Sa (hereinafter called the contact projection) fastened to the heat containing plate 21, the contact projection 28 projecting from the surface 25a distance t, whereby the desired clearance t between the internal surface 25a of the heat containing plate 21 and the slab edge Sa is maintained by the contact of the contact projection 28 with the slab edge Sa. The total length of the contact projection is such that is sufficient to maintain the desired clearance after extending through the thickness of the heat insulating layer 24. It is preferable that the contact projection 28, which is held in contact with or close to the cast slab S at a high temperature for a long time, be made of a heat resisting material such as ceramic, stainless or other heat-resisting alloy steels. The heat containing plate 21 has an appropriate length so as to permit smooth functioning of an operating device 35, described later, and increase the heat containing effect with respect to the slab edges. A plurality of the heat containing plates 21 are preferably disposed in the direction of the travel of the slab S on both sides thereof.

In FIG. 1, reference numeral 45 designates a slab detector. Connected to length measuring rollers 9 in the guide roll group 5, the slab detector 45 of this embodiment detects when the length measuring rollers 9 start or stop measuring the slab length (i.e. start or stop rotating) as the head end of the slab S enters on the tail end thereof clears the length measuring rollers 9. The slab detector 45 also detects the running speed of the slab S. Detection signals from the slab detector 45 are inputted in a control device 49. Receiving the detection signals (indicating the arrival of the head or tail end of the slab S at the length measuring rollers 9) from the slab detector 45, the control device 49 automatically calculates the time required for the head or tail end of the slab S to reach each heat containing plate, on the basis of the pre-calculated distance between the length measuring rollers 9 and individual heat containing plates and the running speed of the slab. Depending on the thus calculated times, the control device 49 issues intermittent operating instructions, described later, to the operating device 35 for each heat containing plate 21.

As is well-known, casting of the slab S is started by passing a dummy bar which leads the head end of the slab S. Moreover, the shape of the slab S toward the tail end becomes tapered or otherwise deformed. If the operating device 35 is actuated while the dummy bar and the deformed section of the slab is passing, various troubles may occur, such as bending of the contact projection 28 and damage to the heat containing plate 21. Such troubles can be prevented by, for example, additionally inputting to the control device 49 such information as the length of the dummy bar to be used, and the length of the deformed section of the slab which can be pre-estimated from the general performance of the continuous casting machine. This permits the control device 49 to issue an intermittent operating instruction after the dummy bar has passed and a cancelling instruction before the defective tail section reaches the heat escape blocking apparatus.

The slab detector 45 is not limited to the above-described means. All that is necessary is that it will be able to detect accurately whether the slab S is in transit ("in transit" designates the period between the detection of the head end of the slab and the detection of the tail end thereof) or not in transit ("not in transit" designates the period between the detection of the tail end of the slab S and the detection of the head end of the next slab S).

Figure 4A:
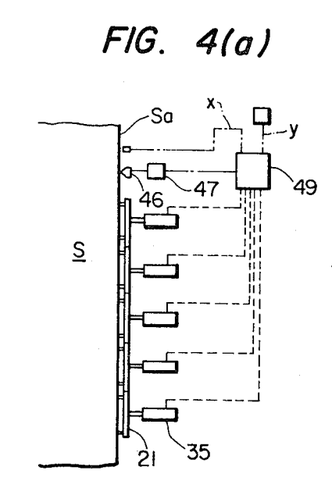
FIGS. 4a and 4b are system diagrams showing the operating mechanisms for the heat escape blocking apparatus of this invention, FIG. 4a showing an operating mechanism having one detecting and one control unit, and FIG. 4b showing an operating mechanism having a plurality of detecting and control units.
Figure 4B:
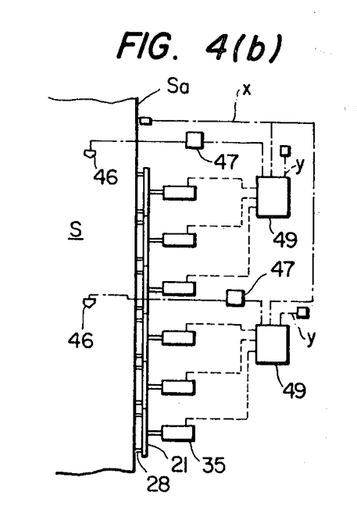

FIGS. 4a and 4b show other slab detectors. In these detectors, a photoelectric tube or supersonic or other detecting element 46 is provided in front of the foremost heat containing plate 21 (FIG. 4a), or a plurality of such detecting elements are provided at suitable intervals, as shown in FIG. 4b. Alternatively, they may be provided in front of each heat containing plate 21. Detection signals from the detecting element 46 are inputted through a converter 47 to the control device 49. Also inputted are the slab speed information x and the distance information y (the distance between the detecting element 46 and each heat containing plate), and the control device 49 detects whether the slab S is or is not in transit with respect to each heat containing plate, as with the above-described embodiment.

It is preferable that the detecting element 46 and the slab detector 45 of FIG. 1 be installed where the tail end of the slab S can be detected before the deformed tail section of the slab reaches the foremost or any specific one of the heat containing plates so that the control device 49 can issue an operation cancelling instruction on the basis of the detection signals therefrom.

The action produced by the detection signals from the slab detector 45 includes a judgement as to whether the regularly shaped slab S is passing each heat containing plate, depending on the structure, type and position of the slab detector 45, and, if necessary, detecting the passage of the dummy bar and the deformed tail section.

When the slab detector 45 and control device 49 detect that the slab S is passing a heat containing plate 21, the control device 49 issues an operating instruction to actuate the operating device 35 for causing the heat containing plate 21 to be advanced until the contact projection 28 comes in contact with the slab edge Sa. The position of the edge of the slab S changes during transit due to bulging, meandering, and other reasons. The apparatus of this invention keeps the clearance between the heat containing plate 21 and the slab edge Sa substantially constant, efficiently following the positional change of the slab edge by means of the intermittent operating signals from the operating device 35.

Figure 5:
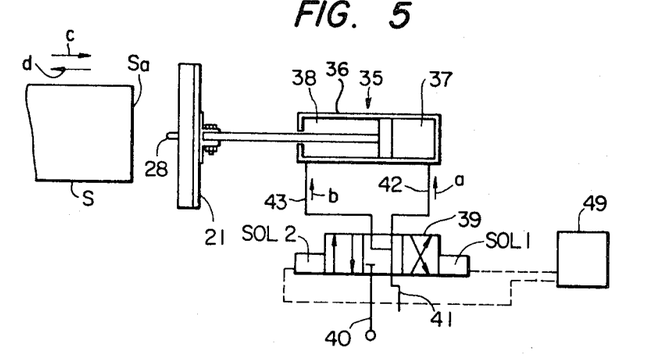
FIG. 5 shows a drive unit for reciprocating a heat containing plate.
Figure 6:
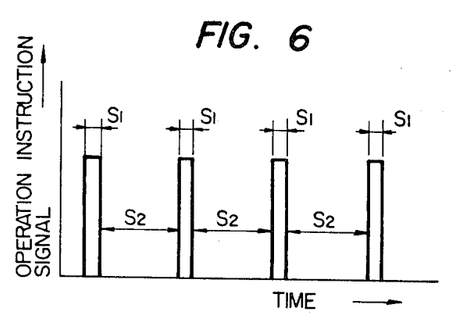
FIG. 6 is a diagram of the operating instructions for intermittently reciprocating the heat containing plate.

FIGS. 5 and 6 respectively show an example of the operating device according to this invention and the intermittent operating signals issued therefrom. This operating device 35 comprises a pneumatic cylinder 36, a solenoid valve 39, a compressed air supply pipe 40, a discharge pipe 41, and communication pipes 42 and 43 connecting the cylinder 36 with the solenoid valve 39. Upon receiving an operating signal from the control device 49, the solenoid $SOL_1$ of the solenoid valve 39 is energized to introduce the compressed air from the supply pipe 40 through the communication pipe 42 in the direction indicated by the arrow a, whereby the piston-cylinder device 36 advances the heat containing plate 21 toward the slab edge Sa. While the solenoid $SOL_1$ is energized, the heat containing plate 21 advances until the contact projection 28 contacts the slab edge Sa. Then the contact projection 28 is held in contact for a given time (holding time $S_1$ in FIG. 6), after which the clearance t between the heat containing plate 21 and the slab edge Sa is set. The pressure of the compressed air is kept just sufficient to reciprocate the heat containing plate 21 smoothly and not to cause the contact projection 28 to produce a defect or scratching on the hot slab edge Sa due to contact therewith. When the holding time $S_1$ has elapsed, an operation cancellation signal from the control device 49 brings the solenoid valve 39 into a neutral position as shown in FIG. 5, whereby the compressed air in the cylinder 36 and the communication pipe 42 is discharged into the atmosphere through the discharge pipe 41. As a consequence, the pressure in the communication pipes 42 and 43, the front chamber 37 and the rear chamber 38 of the piston-cylinder device 36 becomes equal (this condition is hereinafter called the equilibrium state). In the equilibrium state, no reciprocating force is applied by the piston-cylinder device 36. Therefore, if the slab edge Sa moves in the direction of the arrow c, the slab edge Sa pushes the contact projection 28, so that the heat containing plate 21 moves backward a distance corresponding to the displacement of the slab edge Sa. If the slab edge Sa moves in the direction of the arrow d, the heat containing plate 21 on the opposite side of the slab, not shown, moves backward similarly, the heat containing plate 21 shown remaining in the same position. After repeated backward movements, the clearance t between the slab edge Sa and the heat containing plate 21 increases. To correct for this increase, the control device 49 issues an operating instruction on an appropriate cycle (at intervals of equilibrium time $S_2$ in FIG. 6), thereby moving the heat containing plate 21 forward to reset the clearance t to a new set width. The equilibrium time $S_2$ may be preset at an optimum time, considering the occurrence of bulging and meandering of the slab S, the length and position of the individual heat containing plates 21, and other conditions. The equilibrium time $S_2$ may be kept constant or suitably varied in the initial, intermediate and final stages of the casting operation.

The intermittent operating instructions according to this invention are such as to provide the holding time $S_1$ and equilibrium time $S_2$ repeatedly.

When the tail end of the slab S is detected, or when the slab S is not passing the heat containing plate, the intermittent operating instruction is discontinued. Then the control device 49 issues an operation cancellation instruction, whereby the solenoid $SOL_2$ of the solenoid valve 39 becomes energized, compressed air is introduced from the supply pipe 40 through the communication pipe 43 in the direction of the arrow b, and the piston-cylinder device 36 moves the heat containing plate 21 back to the retracted position. The heat containing plate 21 stands by in this retracted position until the start of the next slab is detected. The operating device 35 utilizing compressed air, such as the one described above, effectively provides a low contact pressure with ease, making possible the equilibrium state, and simplifying the entire structure of the heat escape blocking apparatus. But the operating device 35 is by no means limited to a pneumatic piston-cylinder device. Any equivalent device can be used as long as it can carry out the above-described functions. For example, liquid, such as oil, may be utilized instead of air.

As described above, this invention substantially reduces the temperature drop in the side portions of the slab by covering the side portions of the slab S with the heat containing plate 21 having the highly effective heat-insulating layer 24, while leaving the slight heat containing clearance t therebetween. In an experiment with a 250 mm thick, 1000 mm wide slab S passed at a speed of 1.6 m per minute, the temperature drop in the slab S travelling through the guide roll group 5 having no heat containing apparatus was only between 5° and 7° C. per minute in the middle, but as much as between 10° and 15° C. per minute in both side portions. When the heat escape blocking apparatus of this invention was provided covering a distance of approximately 17 m from the delivery end of the guide roll group 5, by contrast, the temperature drop in the slab side portions was sharply reduced to between 1° and 2° C. per minute.

The rolls in the guide roll group 5 are provided at very close intervals, with the clearance between adjacent rolls generally being as small as between 70 and 100 mm. With such closely spaced rolls, a plain heat containing plate 21 without the strip members 25 can provide an adequate heat containing effect for the edges of the slab.

Embodiment II

Figure 7:
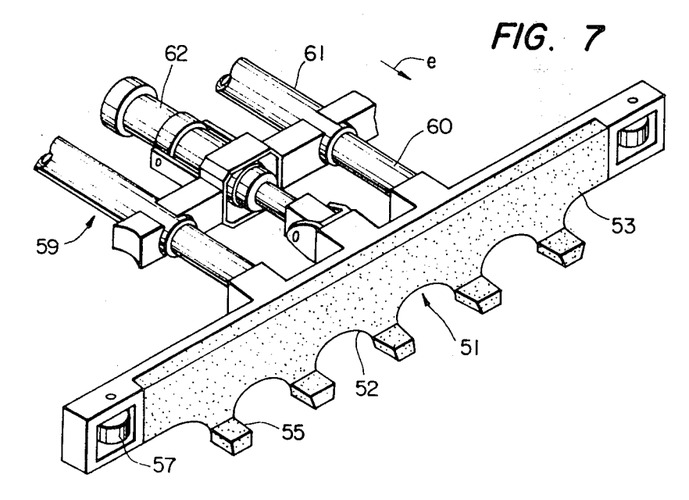
FIG. 7 is a perspective view showing the principal part of a second embodiment of the heat escape blocking apparatus according to this invention.
Figure 8:
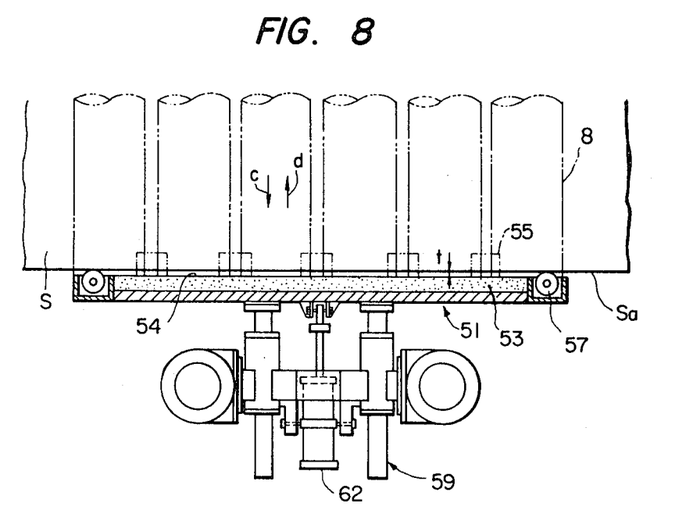
FIG. 8 is a plan view of the apparatus shown in FIG. 7.

FIGS. 7 and 8 show a second embodiment of this invention. FIG. 7 shows only the lower half portion of a heat escape blocking apparatus installed in an appropriate position on the delivery side of the guide roll group 5, it being understood that there is a corresponding upper half portion (not shown) cooperating with upper guide rolls of the apparatus. In FIGS. 7 and 8, reference numeral 8 designates a guide roll. A heat containing plate 51 has a plurality of cut-out recesses 52 corresponding in shape with a portion of the periphery of guide rolls 8, and strip members 55 projecting from the top and bottom edges of the containing plate 51 to filling the clearances between adjacent guide rolls 8. The heat containing plate 51 is mounted for reciprocal sliding movement toward and away from the slab on a slidable support member 59, and is lined on the inside with a heat-insulating material 53 such as asbestos or ceramic fiber. Reference numeral 57 denotes rollers attached to the opposite ends of the heat containing plate 51 in a position such that the peripheral surface of the rollers projects beyond the internal surface 54 of the heat containing plate 51 by a given distance which equal the clearance t. Item 62 is a fluid pressure generator means that generates a constant fluid pressure for pushing the heat containing plate 51 toward the edge of the slab, as indicated by the arrow e, with an appropriate pressure.

In operation when the slab S reaches the point where the heat containing plate 51 is provided, following the start of the casting of the slab S on the continuous casting machine, the constant pressure generator means 62 pushes the heat containing plate 51 toward the edge Sa of the slab until the roller 57 comes in contact therewith. The pressure of the contact pressure generator means 62 is at all times controlled so that it remains at a predetermined level. The roller 57 remains in rotating contact with the edge Sa of the slab under said predetermined pressure. Accordingly, when the slab S moves in the direction of the arrow d in FIG. 8, the heat containing plate 51 also moves forward, following the slab S. When the slab S moves in the opposite direction indicated by the arrow c, the heat containing plate 51 withdraws. Thus when the position of the edge Sa of the slab changes due to bulging or meandering of the slab S, the heat containing plate 51 follows such movement, thus keeping the predetermined clearance t between the edge of the slab and the internal surface 54 of the heat containing plate 51. The type and structure of the constant pressure generator means 62 are not limited to those described above, so long as the above-described functions can be carried out. For example, a compression spring, or a pneumatic or hydraulic piston-cylinder means can be utilized, depending on the size, weight, reciprocating stroke and other characteristics of the heat containing plate 51. According to the experience of the inventors, a pneumatic piston-cylinder type pressure generator means has proved particularly effective, making it possible to provide a large reciprocating stroke and to select a desired pressure simply by changing the pneumatic pressure or the cylinder diameter.

Because it is kept in constant contact with the edge Sa of the high temperature slab, the roller 57 should preferably be made of a heat-resisting material such as stainless steel. It is also effective to cool the roller 57 by circulating a coolant such as water, compressed air, or aqueous vapor through a passage, not shown, formed inside thereof. The slidable support member 59, supporting the heat containing plate 51 for its reciprocating sliding movement, can also be suitably designed so as to be smoothly moved back and forth by the force of the constant pressure generator means 62, depending on the size, length, weight and other characteristics of the heat containing plate 51. For example, the slidable support member 59 may be a rod-like slidable member 60 extending through a hollow support member 61, as shown in FIGS. 7 and 8. The constant pressure generator means 62 also may be connected either directly to the heat containing plate 51, exerting its force parallel to the slidable support member 59, as shown in FIGS. 7 and 8, or indirectly connected to the plate 51 by way of the slidable support member 59.

As described above, the roller 57 and the constant pressure generator means acting on the heat containing plate 51, although being a simple structure, causes the heat containing plate 51 to follow the positional change of the edge of the slab effectively. This greatly reduces the detrimental temperature drop in the side portions of the slab. As a consequence, the hot slabs being discharged from the continuous casting machine can be supplied directly to the subsequent rolling process as they are or after a slight heating, thus permitting the continuous rolling or hot charging. It will thus be understood that this invention provides a very great practical improvement over the prior art.

Embodiment III

Figure 9:
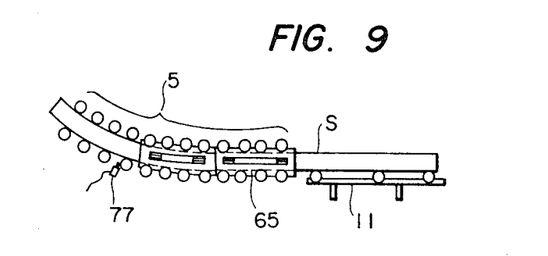
FIG. 9 is a partial cross-sectional view showing a third embodiment of this invention associated with the delivery end of the guide roll group.
Figure 10:
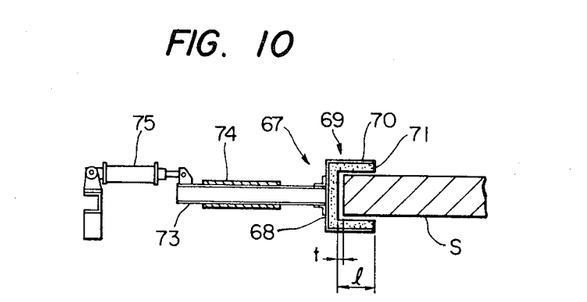
FIG. 10 is a transverse cross section of the heat containing cover shown in FIG. 9.
Figure 11:
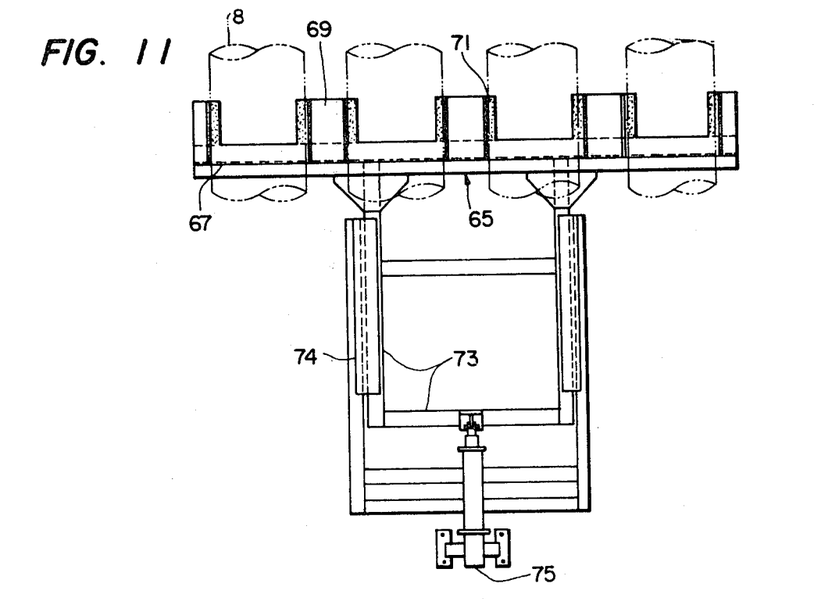
FIG. 11 is a plan view of the cover shown in FIG. 10.

FIG. 9 shows the delivery end of the guide roll group 5 with a third embodiment of this invention mounted thereat. In FIG. 9, reference numeral 65 designates a heat containing cover, and a detector 77 is provided upstream thereof to continuously detect the passage of the side edge of the slab S. As shown in FIG. 10 and FIG. 11, the heat containing cover 65 comprises a heat-insulating side plate 67 (hereinafter called the side plate) and strip-like heat-insulating members 69 (hereinafter called the strip members) fastened to the top and bottom edges of the side plate 67 to fill the clearances between adjacent top and bottom guide rolls. The side plate 67 and the strip members 69 of this embodiment are constituted by frame members 68 and 70 of steel plate material, lined on the inside with heat-insulating material 71 such as asbestos or ceramic fiber to enhance the heat insulating performance of the heat containing cover 65. The heat containing cover 65 can be moved sideways by actuating a drive unit 75, such as a hydraulic or pneumatic piston-cylinder means or an electric motor connected to the heat containing cover 65 through a connecting rod 73. In this embodiment, the side plate 67, and hence cover 65, is supported for transverse movement by the connecting rod 73 which in turn is slidably supported in a guide frame 74.

Figure 12:
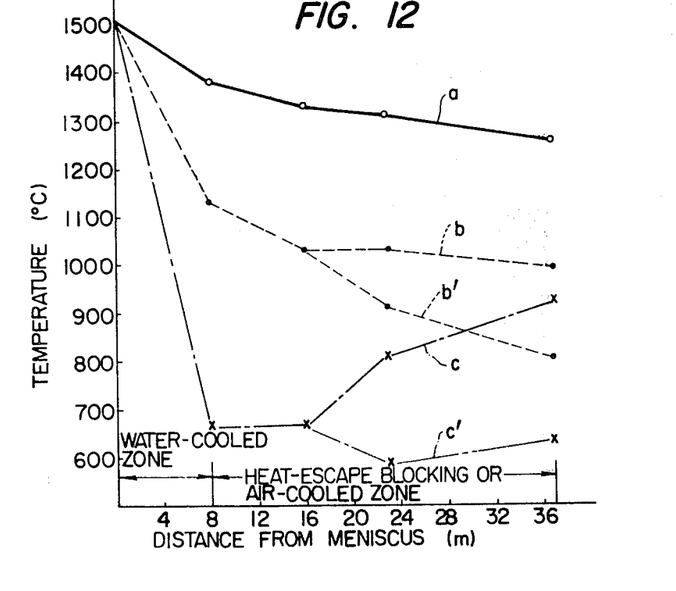
FIG. 12 is a graph showing the relationship between the distance from the meniscus and the cast slab temperature, based on the results of experiments on the effect of the heat escape blocking apparatus according to this invention.

FIG. 12 shows the results of an experiment to show the temperature drop in the slab S, with and without the heat containing cover 65 of this embodiment.

A slab S 250 mm thick and 1000 mm wide was continuously cast at a speed of 1.6 m per minute. This experiment compared the temperatures at the center of the slab in the direction of the width, a point 25 mm away from the side edge thereof, and at the side edge, each being averaged over the thickness of the slab. In the heat containing cover 65 used in the experiment, the length l of the strip member 69 (see FIG. 10) was 100 mm, and the clearance t between the edge of the slab S and the internal surface of the heat containing cover 65 was 30 mm. In FIG. 12, the temperature at the center of the slab width is indicated by the solid line a, and as can be seen, remained as high as 1211° C. on the delivery end of the guide roll group 5 or 36 m away from the meniscus without the heat containing cover 65. The temperatures at the point 25 mm away from the edge and at the edge are indicated by the dashed lines b and b' and c and c' respectively, and as can be seen, the temperature when the heat containing cover was not used and normal cooling in air took place, dropped sharply to 800° C. and 630° C., as indicated by the dashed line b' and the dot-dash line c'. When the heat containing cover 65 according to this invention was provided next succeeding the water-cooled guide roll group 5 (up to 16 m away from the meniscus), the temperature drop was greatly reduced, the temperature at the point 25 mm from the edge being 997° C. at the point 36 m from the meniscus, and the temperature at the edge being 921° C. at the point 36 m from the meniscus, as indicated by the dash line b and the dot-dash line c, respectively.

Thus, the provision of the heat containing cover 65 of this invention, by keeping the heat in the side portions of the slab, makes it possible to supply the slab S from the guide roll group 5 directly into the subsequent rolling mill, after only slightly heating the side portions of the slab, for example by using an induction side heater, etc.

Figure 13:
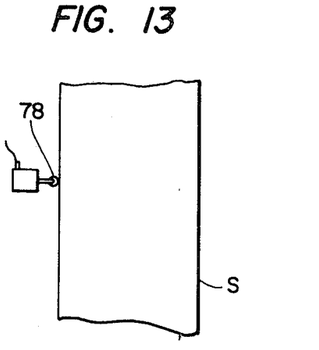
FIG. 13 is a plan view showing one embodiment of a device for detecting the edge of the cast slab.
Figure 14:
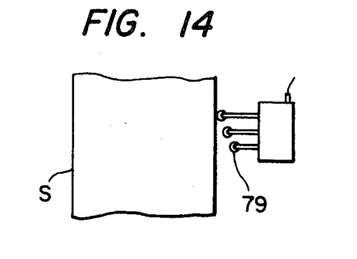
FIG. 14 is a plan view showing another embodiment of the slab edge detecting device.

For increasing the effect of the heat containing cover 65, it is desirable to make the clearance t between the surface of the slab S and the internal surface of the heat containing cover 65 or, more specifically, the heat-insulating material 71, as small as possible. However, the position of the side edge of the slab S often changes due to bulging or meandering. To cope with this change, the detector 77 is provided to continuously detect the position of the side edge of the slab S. It is positioned ahead of where the slab S passes the heat containing cover 65. Detection signals from the detector 77 actuate the drive unit 75 so that the clearance t between the side edge of the slab S and the internal surface of the heat-insulating material 71 are kept at the desired value. There are no specific limitations on the structure and type of the detector 77 so long as it is capable of detecting the position, and especially the change in position, of the side edge of the slab S. For example, known photoelectric tubes, lasers or high-frequency detectors may be utilized. As shown in FIG. 13, a contact element 78 may be provided in contact with the side edge of the slab S so as to detect the displacement thereof from a reference point. Alternatively, as shown in FIG. 14, a plurality of detecting terminals 79 may be provided, appropriately staggered in the direction of the slab width, so as to detect the position of the edge of the slab.

As will be understood, this simple apparatus can be easily and accurately installed in the tightly-spaced guide roll group 5. The controlling of the clearance t between the heat containing cover 65 and the edge of the slab S to an optimum value despite bulging or meandering of the edge of the slab adds greatly to the effectiveness of the heat containing cover 65 in containing the heat within the apparatus. The heat containing cover 65 may be installed along an appropriate part of the delivery end of the guide roll group 5, depending on the capacity and length of the continuous casting machine, the kinds of products manufactured, and other factors. The length of the heat containing cover 65 and the length l of the strip members 69 can also be changed as desired. Particularly when the heat containing cover 65 is long, it may be desirable to divide it into shorter lengths, as shown in FIG. 9, so that the individual sections can be readily moved laterally relative to the slab. It is also possible, and effective, to provide the detector 77 in front of each of such sections to provide individual control of the transverse movements of the sections.

Embodiment IV

Figure 15:
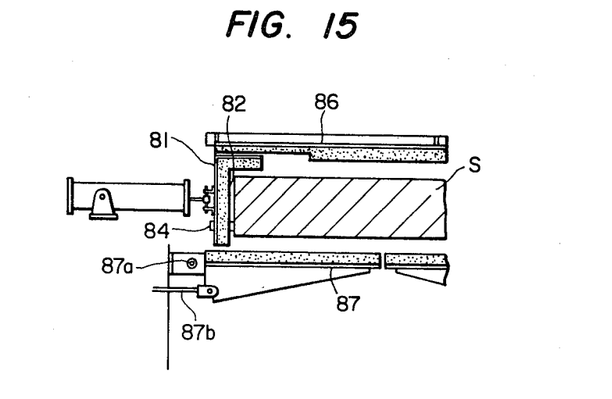
FIG. 15 is a transverse cross section showing an embodiment of the heat escape blocking apparatus of this invention provided over the runout table.

The heat escape blocking apparatus of this invention is also useful at other places where the slab S is continuously conveyed or, more specifically, to the section in front of the slab cutter 12 (see FIG. 1). FIG. 15 shows an embodiment of the heat escape blocking apparatus installed on the runout table 11. A heat containing plate 81 facing the side edge of the slab has an "inverted L shaped" cross section. A contact projection 84 is fastened to the heat containing plate 81 and projects from the internal surface 82 thereof. In FIG. 15, reference numeral 86 designates a top heat containing cover that is detachable or movable in the direction of travel of the slab S, and 87 designates an open-close type bottom heat containing cover, the parts of which can be pivoted downwardly around pivots 87a by rods 87b driven by drive means (not shown).

Figure 16:
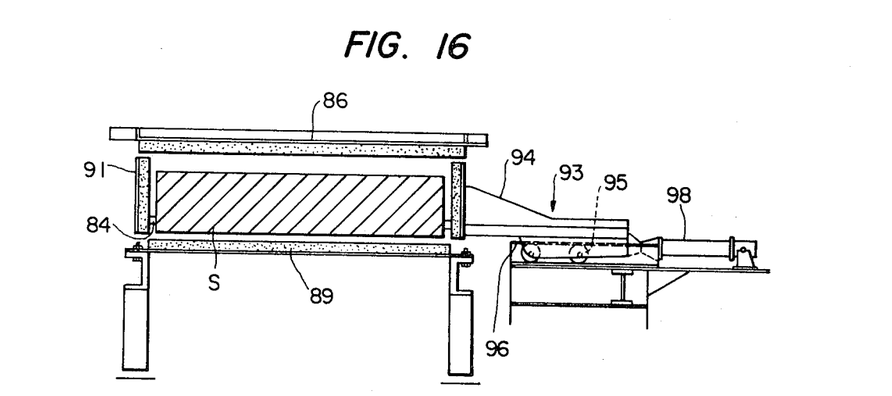
FIG. 16 is a transverse cross section showing another embodiment of the heat escape blocking apparatus of this invention provided over the runout table.

FIG. 16 shows another embodiment of the heat containing apparatus installed on the runout table 11, having a detachable bottom heat containing cover 89. A device 93 for reciprocatingly moving the heat containing plate 91 is constituted by a slide frame 94 with rollers 95 and a support rail 96 on which said rollers 95 roll. The slide frame 94 is moved back and forth by a hydraulic piston-cylinder means 98, as in the above-described embodiments.

Provision of the heat containing apparatus on the runout table, in addition to providing it in the guide roll group, appreciably adds to the heat escape blocking effect on the cast slab.

What is claimed is:

1. An apparatus for blocking escape of heat in hot slabs manufactured on a continuous casting machine having a group of top and bottom withdrawal guide rolls positioned one after the other in the longitudinal direction of the cast slab, which apparatus comprises:

at least one heat containing cover on each side of the casting machine extending in the longitudinal direction of the cast slab and facing the side edges of the slab, said heat containing covers each comprising a heat containing plate and a heat-insulating material on the inside surface thereof, and said heat containing cover having a plurality of substantially semi-circular cut-out recesses in the upper and lower portions thereof for fitting around the lower and upper portions of the top and bottom withdrawal guide rolls and visor-like strip members on the upper and lower edges of said covers between adjacent recesses and projecting between adjacent withdrawal guide rolls in a direction parallel to the axes thereof;

a contacting means on said heat containing cover extending toward the side edge of the slab for contacting the side edge of the slab for maintaining a predetermined clearance between the internal surface of the heat containing cover and the side edge of the slab;

means for supporting the heat containing covers for reciprocal movement in the direction of the axes of the withdrawal guide rolls; and means connected to said heat containing covers for reciprocating said heat containing covers independently of each other for keeping said contacting means in contact with the side edge of the slab.

2. An apparatus according to claim 1, in which said contacting means is a projection on said cover extending toward the side edge of the slab for contacting the slab.

3. An apparatus according to claim 1, in which said contacting means is a roller means on said cover with the peripheral surface extending toward the side edge of the slab for contacting the side edge of the slab.

* * * * *